United States Patent [19]

Gray

[11] Patent Number: 4,637,423

[45] Date of Patent: Jan. 20, 1987

[54] PNEUMATIC GAS CYLINDER VALVE ACTUATOR

[76] Inventor: David K. Gray, 116 Dovefield Dr., Lockhart, Tex. 78640

[21] Appl. No.: 780,963

[22] Filed: Sep. 27, 1985

[51] Int. Cl.⁴ .............................................. F16K 27/08
[52] U.S. Cl. .................................. 137/382.5; 251/14; 251/62; 251/250; 251/292
[58] Field of Search ..................... 137/382.5; 251/291, 251/292, 293, 250, 14, 62

[56] References Cited

U.S. PATENT DOCUMENTS

| | | | |
|---|---|---|---|
| 1,341,319 | 5/1920 | Hodges | 251/14 |
| 1,387,715 | 8/1921 | Hickman | 251/293 |
| 1,582,214 | 4/1926 | Gray | 251/14 |
| 1,929,867 | 10/1933 | Hall, Jr. | 251/14 |
| 1,945,680 | 2/1934 | Fahrenkump | 251/14 |
| 2,012,003 | 8/1935 | Hall, Jr. | 251/14 |
| 3,107,080 | 10/1963 | Priese | 251/250 |
| 3,338,140 | 8/1967 | Sheesley | 251/250 |
| 3,596,679 | 8/1971 | Sugden, Jr. | 251/250 |

FOREIGN PATENT DOCUMENTS 1181512  11/1964  Fed. Rep. of Germany ........ 251/14

Primary Examiner—A. Michael Chambers
Attorney, Agent, or Firm—Joseph F. Long

[57] ABSTRACT

A pneumatic gas cylinder valve actuator that clamps to the threads on gas cylinder normally used for threading on a protective cap and is so designed that air pressure up to 100 psi admitted to the internal piston chamber in the valve actuator opens the gas cylinder valve while compressing the springs under the pistons in the internal piston chambers so that when air pressure is cut off the springs return the gas cylinder valve to the closed position; a torque indicator on top of the valve actuator shows proper positioning of the valve actuator clamp to adjust the closing torque exerted by the springs under the pistons to about 70 inch pounds.

8 Claims, 5 Drawing Figures

ASSEMBLY VIEW

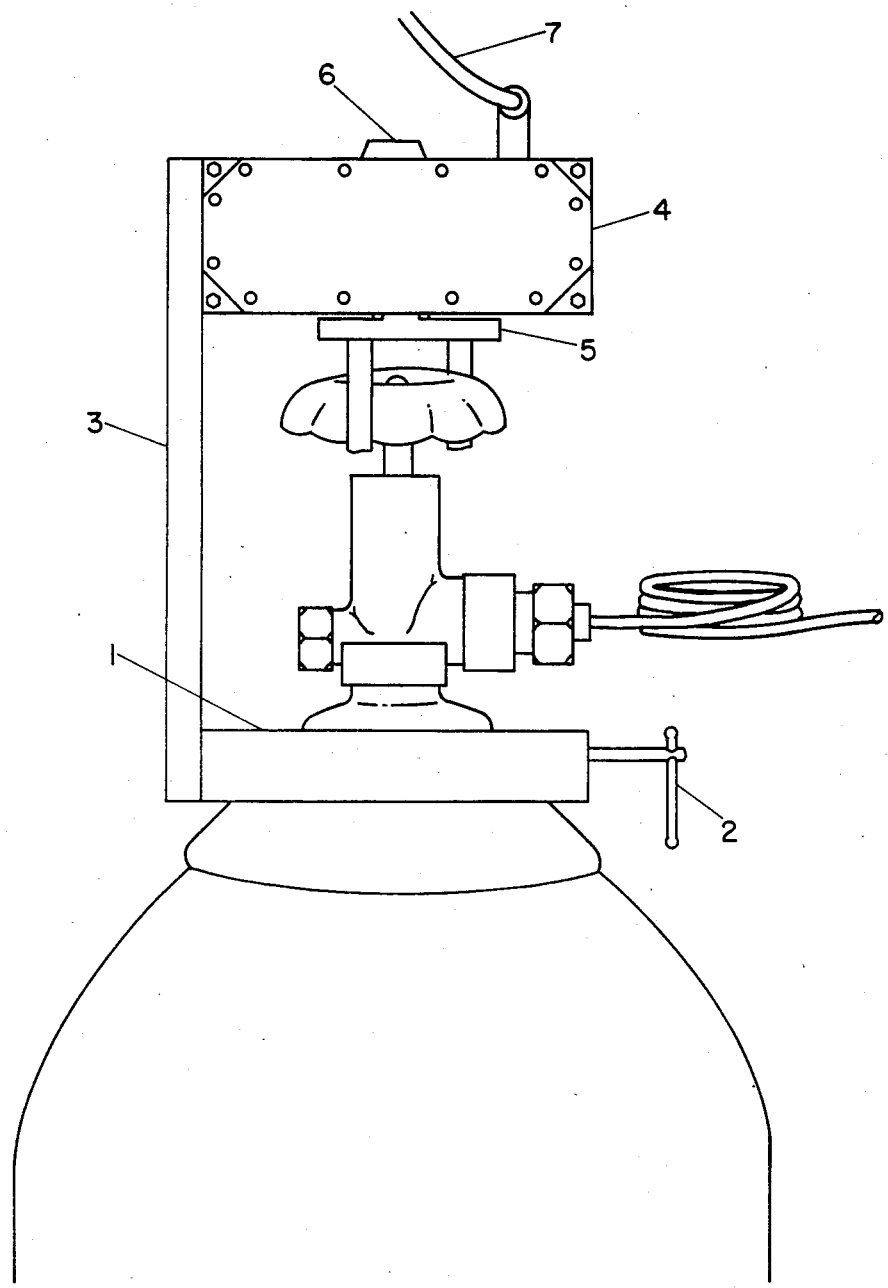
FIG. 1 - ASSEMBLY VIEW

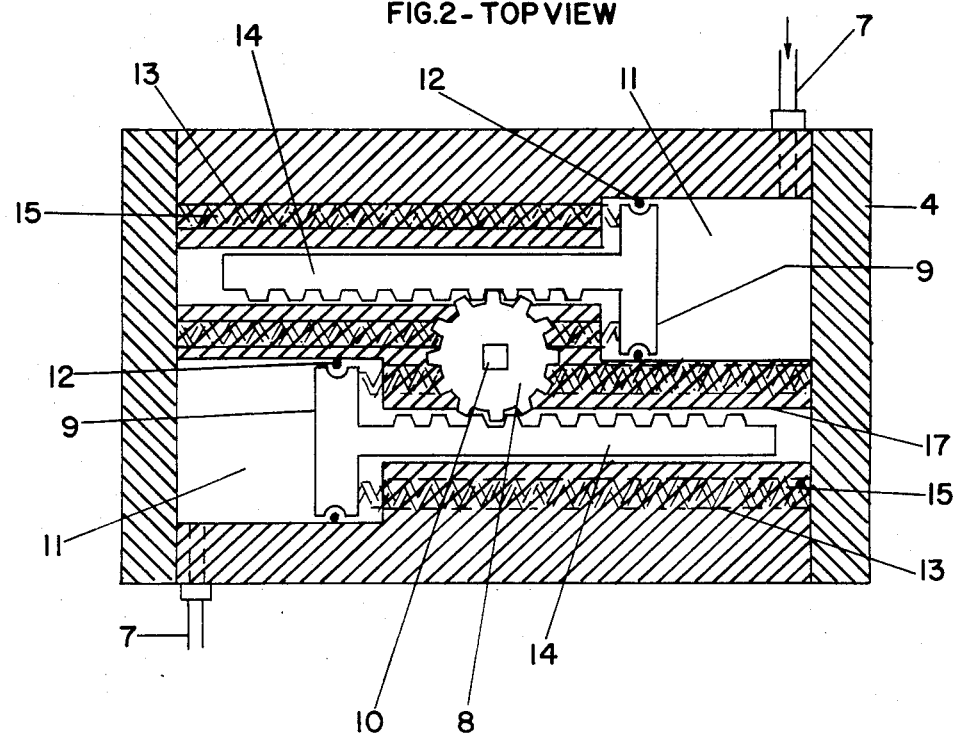
FIG. 2 - TOP VIEW
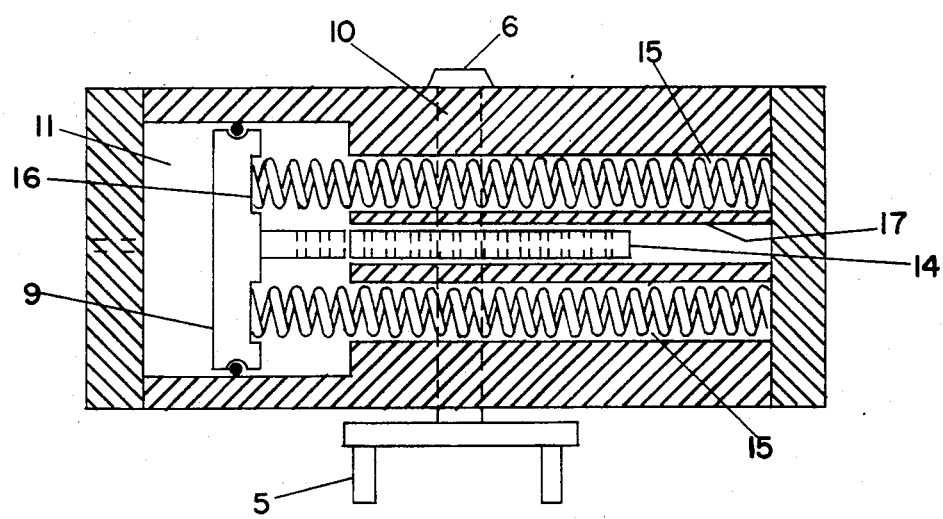
FIG. 3 - SIDE VIEW

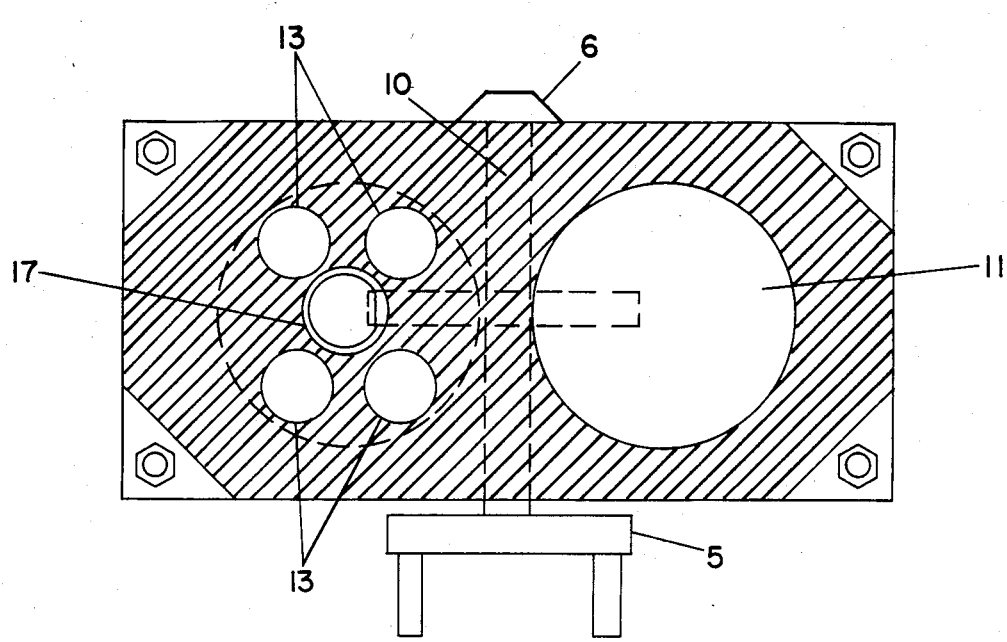
FIG. 4 – END VIEW
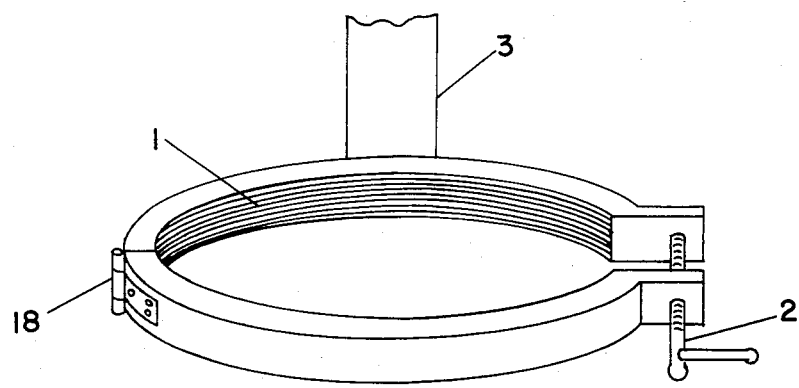
FIG. 5 – HINGED MOUNTING CLAMP

PNEUMATIC GAS CYLINDER VALVE ACTUATOR

BACKGROUND OF THE INVENTION

In many industries, laboratories and hospitals cylinders of compressed gas are routinely used. Commonly multiple cylinders are stored side by side in an upright position and lines are run from a pressure regulator mounted on the cylinder gas outlet to the point of usage. A manual valve integrally mounted on the cylinder is opened to supply gas to the pressure regulator and thence to the user system. If the manual valve is left in the open position even a small leak ahead of the user end point valve will dissipate contents of the cylinders. When using hazardous gases, even small leaks are objectionable. Further, in cases where a hazardous gas is used, remote opening of the manual cylinder valve and closing it when not in use makes for a safer installation. Any remotely activated device to open the manual cylinder valve should be small enough to allow normal storage and hook up of manual valve cylinders in their usual side by side upright position. A device to protect the cylinder valve from breaking off the cylinder in the event the cylinder falls over is desirable. Further, any remotely activated device should be "fail-safe"—that is it should close the manual valve if power to operate the device fails. In this invention the power to operate the device, which we call a "pneumatic gas cylinder valve actuator" is air pressure to open and spring loading to close. Gas pressure opens the valve and spring loading closes the valve. Details of operation will become clear in the remainder of the specification and claims.

The simple installation of a small device as described to remotely open and close the gas cylinder valve would fill a need in the industry.

We have considered patents:
U.S. Pat. No. 3,570,373 issued to W. E. Tupkor 3/16/1971,
U.S. Pat. No. 3,818,808 issued to H. J. Shafer 10/19/1972,
U.S. Pat. No. 4,094,231 issued to Paul Carr 6/12/1973, and
U.S. Pat. No. 4,392,631 issued to J. J. DeWald 7/12/1983
that are in the general field and also industrially available automatic operators. None of these satisfactorily fills the need for a small size, "fail-safe", easily mounted actuator that protects the gas cylinder valve in the event of a fall and opens and closes a gas cylinder valve when activated from a remote point.

Among the objects of this invention are:
(a) to have a rugged small size pneumatically operated actuator to open and close a gas cylinder valve;
(b) to have an actuator as described easily mounted to the cylinder;
(c) to have an actuator as described that closes the gas cylinder valve in case of loss of air pressure or when air pressure is vented from the air line used to activate the actuator;
(d) to close the manual valve sufficiently to close off flow but not to "jam" the valve closed. This is necessary to prevent need for excessive force to open the valve;
(e) to have an actuator so mounted and designed as not to create a hazard if a cylinder accidently falls with actuator in place.

The inventions involve proper sizing and positioning of components to fit in an actuator valve body no more than about 4 inches thick, 8 inches wide and 10 inches long and a positional clamping means to adjust closing torque on the gas cylinder manual valve while fastening simply on threads normally available on the gas cylinder. Piston size is such as to provide sufficient force with available air pressure of up to 100 psi above the pistons to open the gas cylinder valve while compressing springs under the pistons to close the gas cylinder valve when air pressure above the pistons is released. The position of the actuator valve body above the manual valve being opened and closed is critical because the travel of pistons is limited and the position determines compression of springs under the pistons when the actuator is engaged with the gas cylinder valve. The pistons have piston rods called gear racks intermeshed with a flat operator gear within the actuator valve body to translate piston motion to open and close the manual cylinder valve. At the time pressure above the pistons acts to open the cyllinder manual valve the springs under the pistons must be compressed sufficiently so that when air pressure above the pistons is released, the springs close the valve firmly. We have found a closure to about 70 inch pounds torque works well. After positioning the pneumatic valve actuator to vertically engage the valve wheel gripper of the actuator with the manual valve when the manual valve is closed, rotation of the body of the actuator is used to set the axial position of the actuator relative to the manual valve to compress the springs under the pistons in the actuator and a specially designed positional clamp is used to clamp the actuator to the threads on the gas cylinder used for threading on the protective cap during transport.

BRIEF DESCRIPTION OF THE DRAWINGS

FIG. 1 shows the valve actuator 4 assembled and clamped to the cylinder indicating size relative to the cylinder body and mounting of the actuator. Also shown is the two pronged valve wheel gripper 5 slidably engaged with the normal manual valve wheel on a cylinder.

FIG. 2 shows a cut-away topview indicating relative piston size 9 and placement and interrelation of pistons 9, piston chambers 11, piston gear racks 14 and flat toothed operator gear 10, two of four spring guides 13 and springs 15 under each piston are also indicated by dotted lines in a different plane than the gear racks 14.

FIG. 3 shows a cut-away sideview indicating one or two gear racks 14, one of two gear rack guides 17, two of the four spring guides under a piston with two springs 15 therein. Both sideviews would be the same but with pistons horizontally opposed as indicated in FIG. 2. Also indicated in dotted lines is the shaft 10 attached to the valve wheel gripper 5 and going through the valve body, engaging the operator gear and terminating in the torque indicator 6.

FIG. 4 shows an end view cut-away indicating one piston in one piston chamber 11, spring guides 13, and gear rack guides 17 under the second piston, the bottom of second piston chamber being dotted as it would not be visible from the view. Interrelation of sizes and location of those elements with the valve wheel gripper shaft 10 which engages the operator gear and valve gripper 5 and torque indicator 6 is indicated.

FIG. 5 shows a hinged threaded clamp 18 with threads 1 matching the threads used for putting a protective cap on a cylinder, clamping bolt 2 for tightening the clamp and a shaft 3 for connection of the clamp with the actuator body.

DETAILED DESCRIPTION OF THE DRAWINGS

In FIG. 1 we show the actuator assembly clamped in place on the threads used to thread a protective cap on the cylinder. The threaded, hinged clamp 1 is tightened on the cylinder threads using the hinged clamp bolt lever 2. A support member 3 rigidly attaches the actuator body 4 to the hinged clamp 1. The valve wheel gripper 5 is simply a two pronged fork that fits over the valve wheel into the normal valve wheel depressions so as to firmly grip the wheel when the gripper is turned.

The gripper 5 is turned by movement of the pistons within the actuator body 4. Activating pressure in the piston chambers in the actuator body 4 moves the gripper 5 to open the gas cylinder manual valve while springs underneath the piston heads move the gripper 5 to close the cylinder manual valve when activating pressure is released. The user normally uses a three-way valve to apply activating pressure and this valve either supplies pressure or vents pressure from the actuator piston chamber.

To mount the actuator on a gas cylinder the clamp 1 is opened and with no activating pressure in the piston chamber of the actuator body 4 the clamp 1 is first loosely fitted over the threads with the valve gripper 5 snugly against the closed gas cylinder manual valve and the actuator body 4 is rotated so that the gripper shaft is aligned with a mark on the torque indicator 6 that has been marked at 70 inch pounds. (The mark may be checked by using a torque the gripper 5 and applying 70 inch pounds against the spring loading of the pistons to see if the shaft of the gripper 5 turns to the torque indicator 6 mark.) When the actuator is properly positioned the hinged clamp bolt 2 is tightened and the piston actuating gas line 7 is attached. The device is then ready for operation.

Fig. 2 is a top cut-away view of the actuator body. The flat toothed operator gear 8 slips over the square valve wheel gripper shaft 10 and intermeshes with each of the two piston gear racks 14. The drawing shows the piston location when the assembly is properly mounted and the gas cylinder valve has been put in the OPEN position by the mechanism. Up to 100 psi inlet pressurizing gas, preferbly nitrogen but usually air, in the piston chamber 11 forces piston 9 to move against the springs in the spring guides 13 with linear motion of piston gear rack 14 rotating the operator gear 8 and thereby the valve gripper shaft 10. Note the piston is effectively sealed with one Buna N elastomer O ring 12 in a preferred embodiment.

FIG. 3 shows a sideview with the gripper 5 being in position of holding the gas cylinder valve essentially closed. When the gas cylinder manual valve is closed proper positioning of the assembly should show the torque indicator 6 at 70 inch pounds. The torque indicator 6 is an aluminum plate fastened to the valve wheel gripper shaft with graduations on the plate and a mark on the valve body to indicate gripper shaft position when 70 inch pounds of torque has been applied through the gripper shaft 10 to the operator gear which is intermeshed with the gear rack 14, when there is atmospheric pressure only in the piston chamber 11. Spring guide depressions 16 keep the springs positioned when springs are at maximum extension.

In FIG. 4 a cut-away end view is given to show relative placement of gear rack guide 17, spring guides 13 and one piston chamber 11. The opposite end view would appear the same. Maximum piston chamber size with optimum placement of springs to balance the force on the piston and to achieve minimum overall size is intended. The valve wheel gripper shaft 10 goes through the operator gear up to the torque indicator 6.

FIG. 5 shows the threaded hinged mounting clamp. In one preferred embodiment threads were machined to match the threads used to thread a protective cap on a standard gas cylinder during transportation. A tongue and groove type hinge 18 and a clamping bolt 2 to slide loosely through one side of the clamp and thread into the other side were used. A shaft 3 approximately 2 inches wide and $\frac{1}{2}$ inch thick was welded to hold the actuator body to the clamping mechanism. It is most convenient to clamp on the mechanism in order to get proper position since this positional adjustment is used to put proper torque when then the actuator closes the cylinder valve.

To recapitulate and clarify working and torque adjustment of the actuator, refer to FIG. 2 and FIG. 3. If the flat operator gear 8 in FIG. 2 were held motionless and the actuator valve body 4 were rotated the piston gear racks 14 would move the pistons 9 within limits of the engaging gear teeth and length of the piston chambers. When clamped in proper axial position relative to the manual valve on the gas cylinder and engaged with the valve gripper 5, FIG. 3, then FIG. 2 shows approximate relation of gear racks 14, gear 8 and compression of springs 15 under the pistons 9, when the gas cylinder manual valve is about one-fourth turn open. One fourth turn is sufficiently open in use. In the position shown there would be up to 100 psi pressure in the piston chambers. Now when the pressure is released from the piston chambers the springs 15 expand and, if the actuator body 4 is rigidly clamped to the cylinder, the expanding springs 15 would close the valve. Now if the hinged mounting clamp were loosened and the actuator body were rotated counter clockwise the pistons would be moved to compress the springs. In the preferred embodiment the springs should be compressed enough to give about 70 inch pounds against the closed manual valve. In order to have this torque from the compression while still having sufficient travel of the pistons 9 to open the manual valve when pressure up to 100 psi is admitted above the pistons 9, the characteristics of the springs, the piston travel and axial position of the actuator valve body relative to the closed manual valve all must be properly related. The hinged clamp as shown in FIG. 5 allows easy positioning of the valve.

In one preferred embodiment the valve body, the pistons, hinge clamp, and hinge clamp support were all made from Aluminum Alloy No. 6061-T6. The gear rack for piston rod was steel made from a Globe No. 2020-4 rack and the operator gear was steel and made from a Boston Gear No. YA-24. The springs were 0.090 inch diameter spring wire with a spring rate of 30 +/− pounds per inch. Four springs were used under each of the pistons; piston diameter was approximately 2.0 inches, and the length of the piston chamber was approximately two inches.

SHORT STATEMENT OF THE INVENTION

A pneumatically operated gas cylinder valve actuator for opening and closing a manual valve on a gas cylinder comprising:

(1) an actuator valve body approximately three inches thick, six inches wide and eight inches long;

(2) a valve wheel gripper to slidably engage the wheel on the manual valve. The gripper is attached to a shaft which extends through the actuator valve body and engages a flat operator gear within the actuator valve body. The upper end of the shaft is attached to a torque indicator plate outside the valve body. There is a mark on the valve body and graduations on the plate to show position of the shaft when springs within the actuator valve body are compressed as will become clear in the following paragraphs;

(3) two pistons with partially toothed piston rods called gear racks, horizontally opposed, on either side of the flat operator gear with teeth on the gear racks and the flat operator gear intermeshing so that simultaneous motion of the gear racks rotate the gear and thus the valve wheel gripper. These pistons are large enough to open the manual valve with less than 100 psi air pressure above the pistons;

(4) means for putting air pressure above each piston to move the pistons to open the manual valve and;

(5) springs under each of the pistons so that when air pressure on top of the pistons is removed, the springs act to reverse the piston motion and close the manual valve;

(6) a torque adjustment to adjust the closing force to close the manual valve firmly but not to "jam" the valve is provided by proper axial positioning of the pneumatic gas cylinder valve actuator body relative to the closed manual valve. Clamping the actuator valve body into proper position is provided by a positional assembly clamping mechanism which clamps to the threaded portion on the cylinder used to threaded on protective valve cap during transportation of the cylinder.

When the valve wheel gripper is engaged with the manual valve with the manual valve in the closed position and there is only atmospheric pressure above the pistons, loosening the assembly clamping mechanism and rotating counter clockwise the pneumatic gas cylinder actuator valve body will result in compressing the springs under the pistons to put a torque or a pressure to further close the valve against the closed valve. This occurs because the valve wheel gripper is rigidly attached to the gripper shaft that engages the flat operator gear within the valve body and this gear is meshed with gear rack attached to the pistons. Thus rotating the valve body will move the pistons and rotating counter clockwise will move the pistons to compress the springs under the pistons.

(7) A torque indicator plate attached to the valve wheel gripper shaft at the point outside the valve actuator body where the shaft extends through the body of the valve actuator with graduations on the plate and a mark on the valve body showing the positions of the gripper shaft when springs under the piston in the actuator valve body are compressed to 20 to 100 inch pounds of torque against the manual cylinder valve when the manual cylinder valve is in the closed position is used to indicate torque.

With the actuator valve dismounted, the location of the marks on the actuator body to show various amount of torque is accomplished by engaging a normal torque wrench with the valve wheel gripper and marking on the torque indicator the position for each 20, 40, 60, 80 and 100 pounds of torque. In the preferred embodiment the torque is set at 70 inch pounds when the actuator valve is mounted.

As outlined above, the invention lies in the combination and special design of elements to operate the manual valve on a gas cylinder; in a valve body easily clamped to the existing threads on a cylinder; in a valve body small enough to allow normal cylinder in-use storage; in pistons in the valve body large enough to be operated with up to 100 psi air pressure normally used for plant instrumentation; in adjustable spring loading to close but not "jam" the manual valve when piston operating pressure is vented, or there is a failure of system supplying air pressure; a torque adjustment by simple rotation of the valve body while loosely clamped to threads on the gas cylinder in the in-use position before clamping firmly; in a simple torque indicator to indicate this torque adjustment or spring compression; in a simple pronged gripper to slideable engage the wheel of the manual valve on the cylinder; in means to translate piston movement to operate the simple pronged gripper to open and close the gas cylinder manual valve and in combination of all these elements in a simple workable valve actuator in a manner to protect the gas cylinder manual valve if the gas cylinder should fall when the actuator is in use.

I claim:

1. A pneumatic gas cylinder valve actuator for operating a manual valve on a gas cylinder comprising:
    (a) an actuator valve body up to 4 inches thick, up to 8 inches wide, and up to 10 inches long,
    (b) a flat toothed operator gear centrally located in said actuator valve body with a flat plane of said flat toothed operator gear parallel to a longer, flat plane of said actuator valve body,
    (c) two piston chambers within said actuator valve body, horizontally opposed with one on either side of said flat toothed operator gear, with a bottom central opening of said piston chambers communicating with said flat toothed operator gear,
    (d) two pistons, one in each of said piston chambers,
    (e) sealing means for each of said pistons,
    (f) means for introducing and venting up to 100 psi air pressure in said piston chambers above each of said pistons,
    (g) means for translating movement of said pistons to operate said manual valve on said gas cylinder to open when said air pressure is admitted into said piston chambers above said pistons,
    (h) spring loading means under each of said pistons to reverse said movement of said pistons to close said manual valve when said air pressure is vented from said piston chambers,
    (i) means for adjusting said spring loading means to provide up to 100 inch pounds of torque holding said manual valve in a closed position.

2. A pneumatic gas cylinder valve actuator for operating a manual valve on a gas cylinder as in claim 1 where said sealing means for each of said pistons comprises up to three elastomeric O rings on said pistons.

3. A pneumatic gas cylinder valve actuator for operating a manual valve on a gas cylinder as in claim 1 where said sealing means for each of said pistons comprises up to three split metallic rings in grooves on said pistons.

4. A pneumatic gas cylinder valve actuator for operating a manual valve on a gas cylinder as in claim 1 where said means for translating movement of said pistons to operate said manual valve comprises:
- (a) 2 toothed gear racks, one attached to a bottom of each of said pistons, each of said toothed gear racks being a toothed piston rod carried in a guide, with teeth on said gear racks intermeshing with teeth on either side of said flat toothed operator gear,
- (b) a shaft at right angles to said angles centrally engaged in said flat toothed operator gear and extending through said actuator valve body,
- (c) an operator wheel on said manual valve,
- (d) a valve wheel gripper attached to said shaft to slidably engage said operator wheel on said manual valve.

5. A pneumatic gas cylinder valve actuator for operating a manual valve on a gas cylinder as in claim 1 where said spring loading means under each of said pistons is up to four coil springs.

6. A pneumatic gas cylinder valve actuator for operating a manual valve on gas cylinder as in claim 5 where said means for adjusting said spring loading means comprises:
- (a) a torque indicator comprising:
  - (1) a flat, round plate of up to 3 inches in diameter attached to said shaft at a point where said shaft emerges from said actuator valve body,
  - (2) graduations on said plate and a mark on said actuator valve body indicating axial position of said shaft in said actuator valve body to indicate compression of said springs under said pistons to show up to 100 pounds of torque,
- (b) means for applying force to adjust axial position of said actuator valve body to compress said coil springs to show up to 100 inch pounds of torque on said torque indicator when said valve wheel gripper attached to said shaft is engaged with said operator wheel on said manual valve and said air pressure to open said manual valve is vented to atmospheric pressure and said manual valve is in the closed position,
- (c) positional clamping means attached to said actuator valve body with threads matching threads normally used to thread a protective cap on said gas cylinder during transportation, to clamp said actuator valve body in said axial position relative to said manual valve to show up to 100 inch pounds of torque on said torque indicator when said manual valve is closed and said manual valve wheel gripper is engaged with said operator manual wheel on said manual valve.

7. A pneumatic gas cylinder valve actuator for operating a manual valve on a gas cylinder as in claim 6 where said positional clamping means comprises:
- (a) a first and second flat semi-circular segment of rectangular cross section,
- (b) threads on interior side of said first and said second semi-circular segments to match threads on said gas cylinder used to thread a protective cap on said gas cylinder during transportation,
- (c) a hinge connecting said first and said second semi-circular segments,
- (d) a first lip on end opposite said hinge on said first semi-circular segment with said first lip containing a hole,
- (e) a second lip on end opposite said hinge connecting said second segment with said first segment and with said second lip containing a threded hole,
- (f) a threaded bolt of diameter to slide through said hole in said first lip and to thread into said threaded hole in said second lip,
- (g) a lever attached to head end of said threaded bolt,
- (h) a shaft up to 10 inches long attached at one end to one of said flat semi-circular segments and at the other end to said actuator valve body at a point to position said actuator valve body centrally above said semi-circular segments and to allow engagement of said valve wheel gripper with said operator wheel of said manual valve.

8. A pneumatic gas cylinder valve actuator for operating a manual valve on a gas cylinder as in claim 5 where said positional clamping means comprises:
- (a) a cylindrical segment with a rectangular cross section,
- (b) threads on inner side of said cylindrical segment to match threads that are normally used to thread a protective cap on said gas cylinder during transportation,
- (c) means to fasten said cylindrical segment in place when said cylindrical segment is threaded on said threads on said cylinder that are normally used to thread a protective cap on said cylinder,
- (d) a shaft up to 10 inches long fastened at one end to said cylindrical segment and at the other end to said actuator valve body at a point to position said actuator valve body centrally above said cylindrical segment so as to allow said valve wheel gripper to engage said operator wheel on said manual valve when said positional clamping means is threaded on said gas cylinder.

* * * * *